(12) United States Patent
Nair et al.

(10) Patent No.: US 6,195,733 B1
(45) Date of Patent: *Feb. 27, 2001

(54) METHOD TO SHARE MEMORY IN A SINGLE CHIP MULTIPROCESSOR SYSTEM

(75) Inventors: N. Gopalan Nair, Phoenix; David Regenold, Tempe, both of AZ (US); Parviz Hatami, Santa Clara, CA (US); Ramprasad Satagopan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/176,413

(22) Filed: Oct. 21, 1998

Related U.S. Application Data

(63) Continuation of application No. 08/723,395, filed on Sep. 30, 1996, now Pat. No. 5,890,013.

(51) Int. Cl.[7] .................................................. G06F 13/00
(52) U.S. Cl. ............................ 711/202; 711/170; 711/153
(58) Field of Search ................................... 711/123, 119, 711/130, 147, 148, 153, 202, 170

(56) References Cited

U.S. PATENT DOCUMENTS

| | | | |
|---|---|---|---|
| 5,539,896 | * | 7/1996 | Lisle ..................................... 711/150 |
| 5,579,503 | * | 11/1996 | Osborne ................................ 711/119 |
| 5,611,075 | * | 3/1997 | Garde .................................... 711/153 |
| 5,909,702 | * | 6/1999 | Jalfon et al. .......................... 711/203 |

\* cited by examiner

*Primary Examiner*—Meng-Ai T. An
*Assistant Examiner*—Jung W. Chang
(74) *Attorney, Agent, or Firm*—Blakely, Sokoloff, Taylor & Zafman LLP

(57) ABSTRACT

A multiprocessor data processing system includes a private data bus and a private program bus coupled to each of the processors. Coupled between the private data buses is a plurality of memory banks, each of which can be dynamically switched between the processors to move blocks of data without physically transferring the data from one bank to another. Likewise, a plurality of memory banks is coupled between the program buses. These memory banks are loaded with pages of program instructions from external memory over a shared bus. Any one of the pages can be coupled to either of the processors on its respective private program bus. When the pages are coupled to the shared bus, they appear as a contiguous address space. When a page is coupled to one of the private program buses, the addressing mode is changed so that the page is mapped to a common address space. This permits the program code to be loaded into any available page, and the processors can execute the code regardless of where it has been loaded, thereby permitting easy relocatability.

6 Claims, 2 Drawing Sheets

METHOD TO SHARE MEMORY IN A SINGLE CHIP MULTIPROCESSOR SYSTEM

This application is a continuation of Ser. No. 08/723,395, filed Sep. 30, 1996, now U.S. Pat. No. 5,890,013.

BACKGROUND OF THE INVENTION

1. Field of the Invention

This invention relates generally to the field of data processing systems and particularly to a shared memory structure for a multiprocessor system.

2. Prior Art

Communications processing in modems, digital cellular phones and the like typically employs a microprocessor controller and one or more digital signal processing (DSP) co-processors. It is desirable to provide a processing system that integrates all communications processing functions on a single integrated circuit. Due to limitations on the number of pins in a package and the long access times to access data from external memory, it is a practical necessity for one or more processors in a single chip multi-processor to execute from internal memory, as well as use internal memory to maintain data. It is necessary to load program code from external memory into the internal memories and execute from them, and at the same time permit relocation of code within the pages of internal memory to facilitate runtime process switching.

Due to the fundamental nature of DSP computations, the integration of data and program memories with the DSP engines on a single chip can provide significant savings in cost and power dissipation. On the other hand, on-chip random access memory (RAM) is very "expensive" in terms of power requirements and silicon area. One alternative is to use programmed read only memory (ROM) for the DSP engines; however, this makes product maintenance and development more difficult. The present invention provides a unique memory architecture that addresses these conflicting requirements.

SUMMARY OF THE INVENTION

The present invention is directed to a data processing system having at least two independent processors. Each of the processors has a private data bus and a private program bus. Coupled between the private data buses is a plurality of memory banks, each of which can be dynamically switched between the processors to move blocks of data without physically transferring the data from one bank to another. Likewise, a plurality of memory banks is coupled between the program buses. These memory banks are loaded with pages of program instructions from external memory over a shared bus. Any one of the pages can be coupled to either of the processors on its respective private program bus. When the pages are coupled to the shared bus, they appear as a contiguous address space. When a page is coupled to one of the private program buses, the addressing mode is changed so that the page is mapped to a common address space. This permits the program code to be loaded into any available page, and the processors can execute the code regardless of where it has been loaded, thereby permitting easy relocatability.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Due to limitations on the number of pins in a package and the long access times to access data from external memory, it is preferable that multiple processors in a single-chip multiprocessor execute from internal memory, as well as use internal memory to maintain data. A flexible internal memory architecture that allows multiple processors to share code and work with limited memory is necessary to make the system efficient.

The invented memory architecture is an extremely flexible architecture and allows multiple processors to use the limited available internal memory in an optimal manner. The memory is divided into several pages and each page can be programmed to be available to any processor. The entire available memory architecture is software configurable and so, depending on the needs of the application can be used optimally by multiple processors.

The presence of a common shared bus to access memory is an essential element of this invention. Also, each memory bank is software configurable by use of memory configuration registers. In a typical three processor system, memory that is used to store program code for two of the three processors is mapped to the same starting address to permit real-time allocation of available memory for scheduled process. Address shadowing (translations) are done to make the addresses contiguous on the shared bus but identical on private buses.

Figure 1:
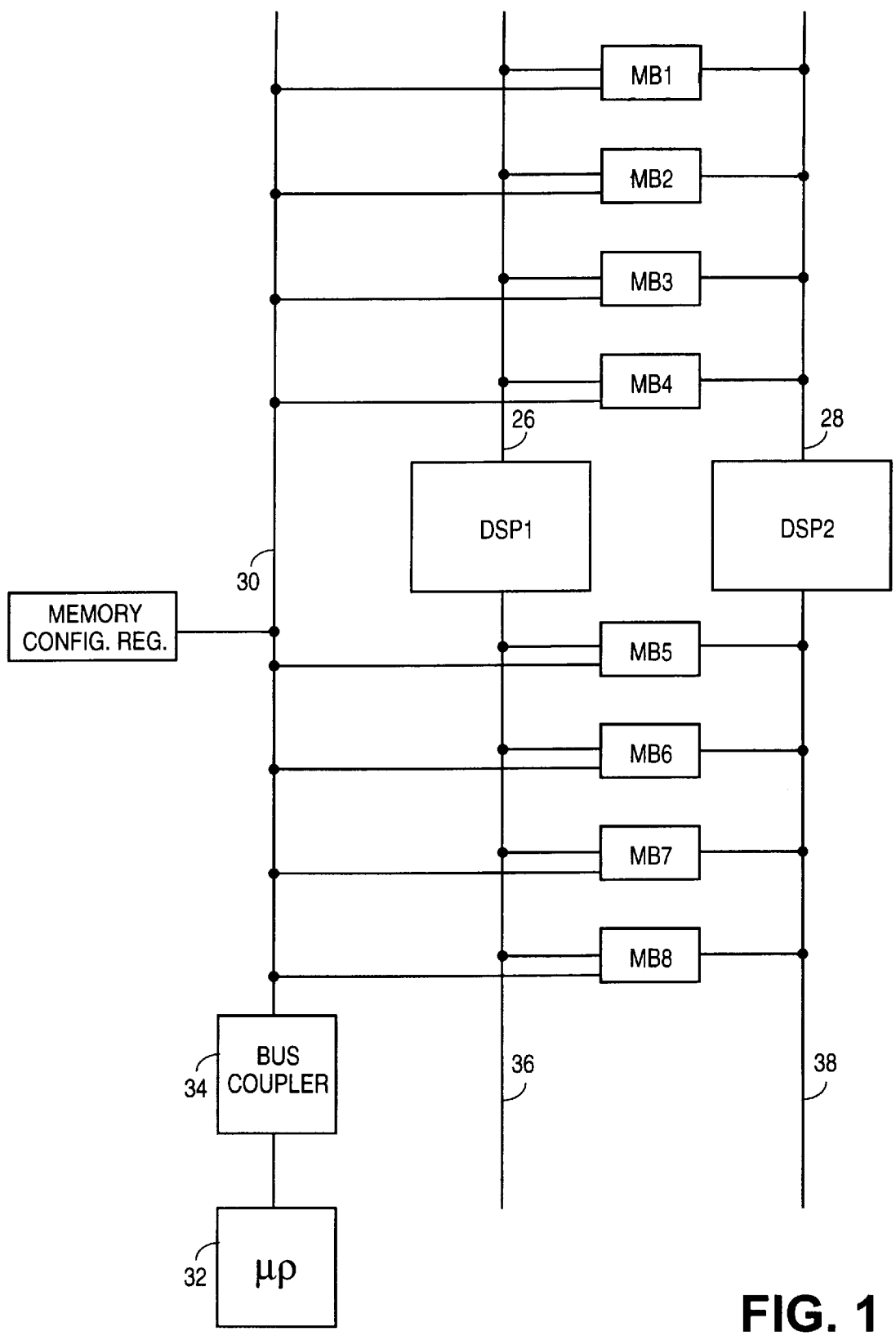
FIG. 1 is a partial block diagram of a multiprocessor system according to the invention.

FIG. 1 illustrates a data processing system incorporating the present invention. A single chip multiprocessor is shown. Such a device may be advantageously employed, for example, as a data communication processor for use in modems, digital cellular phones, and the like. In the illustrated system, there are two digital signal processors (DSP's), designated DSP1 and DSP2. The DSP's are preferably reduced instruction set computing (RISC) processors optimized for performing the repetitive signal processing tasks associated with communications processing. However, the present invention is not limited to communications processing applications. As will be more fully appreciated by the discussion that follows, the present invention has wide applicability in multiprocessor environments.

The system illustrated in FIG. 1 includes an array of random access memories (RAM) or memory banks designated MB1–MB4. Each of these memory banks is coupled to a private program bus 26 for processor DSP1 and to a corresponding private programming bus 28 for processor DSP2. Each of the memory banks is also coupled to a shared bus 30 which communicates with microprocessor 32 through bus coupler 34. Microprocessor 32 is a general purpose processor which supervises operation of the multiprocessor system and, in communications applications, performs protocol and other non-repetitive processing tasks. Additional arrays of RAM MB5–MB8 are coupled to shared bus 30 and to respective private data buses 36 and 38 for DSP1 and DSP2. Although the present invention is described in terms of a multiprocessor system having two DSP's and four banks each of program and data memory, it will be appreciated that the invention is not limited in this regard. The same principles apply regardless of the number or type of processors or the number of shared memory banks.

DSP1 and DSP2 process data in memory banks MB5–MB8 in accordance with program instructions stored in one of memory banks MB1–MB4. Only one of the program memory banks is coupled to a processor at a particular time. Program instructions are stored in off-chip memory devices and are transferred to program memory banks MB1–MB4 over shared bus 30 under the control of a direct memory access (DMA) unit resident in bus coupler 34. Program instructions are transferred to the program memory banks in "pages" as will be more fully explained below. In an exemplary embodiment of this invention, each of program memory banks MB1–MB4 comprises a 512-word memory for a total storage capacity of 2K words.

Digital signal processing programs typically involve repetitive computations with little conditional branching; for example, data pump operations in a modem system. The present invention is particularly well suited for this processing environment. An appropriate page of program instructions is retrieved from the off-chip storage and loaded into an available one of program memory banks MB1–MB4. The memory bank is then coupled to the private program bus of the processor that will perform the program steps of the retrieved page. The other memory banks remain available for use by the other processor or for access to the shared bus to retrieve additional pages. Upon completion of execution of the program steps within a retrieved page, the memory bank is released from the private program bus and another memory bank, containing the program steps that are to be executed next, is coupled to the private program bus. The processors are thus provided with physical memory pages that are swapped virtually immediately without the latency associated with reloading a single dedicated program memory.

Each of the memory banks MB1–MR4 is single-ported, but is software configurable through memory configuration registers. A control word written into the appropriate memory configuration register selects the bus to which the memory bank in connected. In the exemplary embodiment, the control word simply comprises a 2-bit nibble for each of the memory banks to designate the shared bus {0,0}, DSP1 private bus {0,1} or DSP2 private bus {1,0}.

Figure 2:
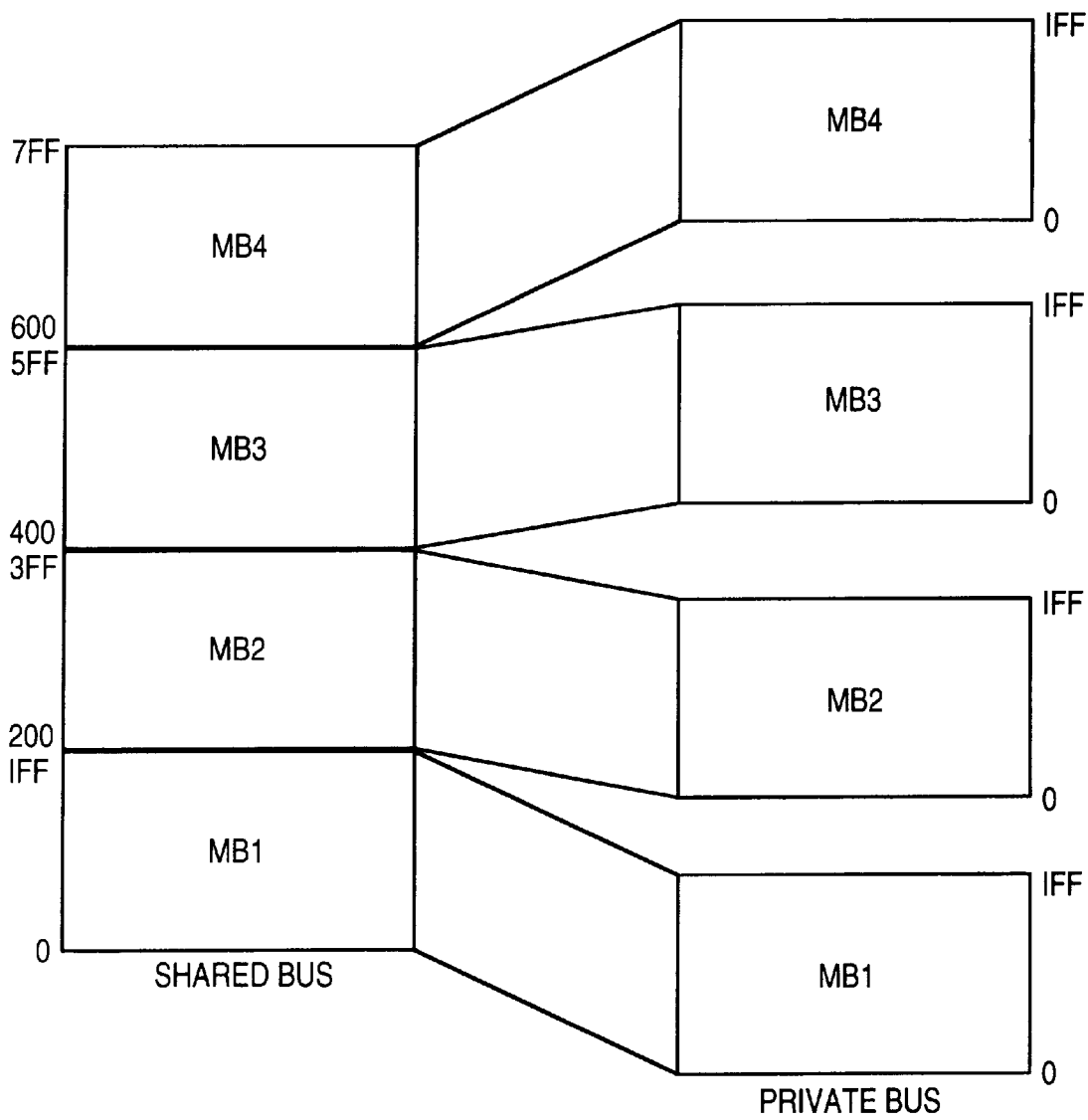
FIG. 2 illustrates translation of the memory bank address space in accordance with the invention.

As already explained, each of the program memory banks MB1–MB4 constitutes a physical page of memory. As illustrated in FIG. 2, these pages collectively appear as a contiguous address space when coupled to the shared bus 30. In the illustrative embodiment described herein, this address space comprises 2K addresses. When the individual memory banks are coupled to one of the private program buses 26 or 28, the addressing mode is changed so that the page is mapped to a single address space of 512 addresses that is the same for each of the memory bank pages. All program code is referenced to a common zero address point and does not need to be recompiled depending on which page the code is in. Thus, depending upon the availability of a physical page, program code can be loaded into any page and the signal processor can execute the program code regardless of where it has been loaded, thereby permitting easy relocatability.

The memory architecture of the present invention may be implemented in one embodiment as follows.

Four banks of RAM each configured as one 512×16 bit segment, for use as program RAM by DSP1 and DSP2.

(MB1, MB2, MB3, MB4) Total size: 4K Bytes, RAM

Two Banks of RAM, each configured as two 256×16 bit segments, accessible to DSP1 and DSP2 extended data ports.

(MB5, MB6) Total size: 1K Bytes, RAM

Two Banks of RAM, each configured as two 256×16 bit segments, accessible to DSP1 and DSP2 extended data ports.

(MB7, MB8) Total size: 1K Bytes, RAM

These memory banks are configured through two memory configuration registers.

Memory Configuration Register 0:

| Bits | Description |
|---|---|
| [15] | Enable bit for MB4 Configuration bits. Write 1 to configure bank |
| [14] | Enable bit for MB3 Configuration bits. Write 1 to configure bank |
| [13] | Enable bit for MB2 Configuration bits. Write 1 to configure bank |
| [12] | Enable bit for MB1 Configuration bits. Write 1 to configure bank |
| [11:10] | Unused |
| [9:8] | Mc_Bnk4[2:0]: Configuration bits for MB4 |
| [7:6] | Mc_Bnk3[2:0]: Configuration bits for MB3 |
| [5:4] | Mc_Bnk2[2:0]: Configuration bits for MB2 |
| [3:2] | Mc_Bnk1[2:0]: Configuration bits for MB1 |
| [1:0] | Unused |

Memory Configuration Register 1:

| Bits | Description |
|---|---|
| [15] | Enable bit for MB8 Configuration bits Active low, Write 0 to configure bank |
| [14:12] | Mc_Bnk8[2:0]: Configuration bits for MB8 |
| [11] | Enable bit for MB7 Configuration bits Active low. Write 0 to configure bank |
| [10:8] | Mc_Bnk7[2:0]: Configuration bits for MB7 |
| [7] | Enable bit for MB6 Configuration bits Active low. Write 0 to configure bank |
| [6:4] | Mc_Bnk6[2:0]: Configuration bits for MB6 |
| [3] | Enable bit for MB5 Configuration bits Active low. Write 0 to configure bank |
| [2:0] | Mc_Bnk5[2:0]: Configuration bits for MB5 |

Program RAM Switchable Between DSP1 and DSP2 (MB1, MB2, MB3, MB4)

The valid configuration bits, Mc_Bnk1, Mc_Bnk2 and Mc_Bnk3 and Mc_Bnk4 are:

| Bits | Description |
|---|---|
| 00 | to bus 30 |
| 01 | to DSP1 Program Bus 26 |
| 10 | to DSP2 Program Bus 28 |

All other selections are undefined.

This set consists of four segments of 512K×16-bit RAMS.

The banks can only be connected to the program bus 26 or 28 of the two DSPs or to bus 30. When connected to bus 30, the DSPs could use it for data handling, even though it could be slower in access than the dedicated blocks, due to the contention.

Data RAM Switchable Between DSP1 and DSP2 (MB5, MB6)

The valid configuration bits, Mc_Bnk5 and Mc_Bnk6 are:

| Bits | Description |
|------|-------------|
| 000  | to bus 30   |
| 001  | to DSP1 Data Expansion Port |
| 010  | to DSP2 Data Expansion Port |

All other selections are undefined.

This set consists of two segments of 256×16 bits of RAM.

The banks can only be switched between the data expansion ports connected to buses 36 and 38 of DSP1 or DSP2, in addition to the connection to bus 30. Therefore, they cannot be used as program memory. They can be dynamically switched between the different buses for transferring blocks of data and messaging.

The enable bit for each field (the MSB of the nibble) should be set to 0 to enable a write into the appropriate bit positions.

Data RAM Switchable Between DSP1 and DSP2 (MB7, MB8)

The valid configuration bits, Mc_Bnk7 and Mc_Bnk8 are:

| Bits | Description |
|------|-------------|
| 000  | to bus 30   |
| 001  | to DSP1 Data Expansion Port |
| 010  | to DSP2 Data Expansion Port |

All other selections are undefined.

This set consists of two segments of 256×16 bits of RAM.

The banks can only be switched between the data expansion ports connected to buses 36 and 38 of DSP1 or DSP2, in addition to the connection to bus 30. Therefore, they cannot be used as program memory. They can be dynamically switched between the different buses for transferring blocks of data and messaging. The enable bit for each field (the MSB of the nibble) should be set to 0 to enable a write into the appropriate bit positions.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:

1. A method to share memory in a single chip multiprocessor system, the method comprising:

presenting a shared bus coupled to a microprocessor through a bus coupler;

presenting a first digital signal processor coupled to a first array of random access memories over a first private program bus, wherein the first array of random access memories is coupled to the shared bus;

presenting a second digital signal processor coupled to a second array of random access memories over a second private program bus, wherein the second array of random access memories is coupled to the shared bus, wherein each of the first digital signal processor and the second digital signal processor are adapted to process data in the second array of random access memories in accordance with program instructions stored in one of first array of random access memories;

loading a predetermined page of program instructions into at least a first and second available memory of the first array of random access memories;

coupling the first memory to one of the first private program bus and the second private program bus;

executing the program instructions in one of the first digital signal processor and the second digital signal processor;

releasing the first memory from one of the first private program bus and the second private program bus;

coupling the second memory to one of the first private program bus and the second private program bus;

executing the program instructions in one of the first digital signal processor and the second digital signal processor; and releasing the second memory from one of the first private program bus and the second private program bus.

2. The method of claim 1, wherein loading a predetermined page of program instructions into at least a first and second available memory of the first array of random access memories includes making at least one memory of the first array of random access memories available for use by one of the first digital signal processor, the second digital signal processor, and the shared bus.

3. The method of claim 1, further comprising:

supervising each execution of the program instructions with the microprocessor as a general purpose processor.

4. The method of claim 1, further comprising:

performing at least one non-repetitive, communications application processing task with the microprocessor.

5. The method of claim 1, further comprising:

storing program instructions in at least one off-chip memory device;

transferring program instructions to the first array of random access memories over the shared bus under the control of a direct memory access unit resident in the bus coupler.

6. The method of claim 1 wherein presenting the first digital signal processor and the second digital signal processor includes presenting a reduced instruction set computing processor that is optimized to perform repetitive signal processing tasks associated with communications processing.

* * * * *